United States Patent
Doetsch et al.

(10) Patent No.: US 9,565,698 B2
(45) Date of Patent: Feb. 7, 2017

(54) BASE STATION AND TERMINAL FOR A CELLULAR COMMUNICATIONS SYSTEM

(71) Applicant: Alcatel Lucent, Boulogne Billancourt (FR)

(72) Inventors: Uwe Doetsch, Stuttgart (DE); Andre Fonseca Dos Santos, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/761,512

(22) PCT Filed: Dec. 3, 2013

(86) PCT No.: PCT/EP2013/075302
§ 371 (c)(1),
(2) Date: Jul. 16, 2015

(87) PCT Pub. No.: WO2014/111193
PCT Pub. Date: Jul. 24, 2014

(65) Prior Publication Data
US 2015/0365970 A1 Dec. 17, 2015

(30) Foreign Application Priority Data
Jan. 16, 2013 (EP) .................................... 13290010

(51) Int. Cl.
*H04J 11/00* (2006.01)
*H04W 74/00* (2009.01)
(Continued)

(52) U.S. Cl.
CPC ....... *H04W 74/006* (2013.01); *H04W 72/1289* (2013.01); *H04W 72/1294* (2013.01);
(Continued)

(58) Field of Classification Search
CPC .......... H04W 74/006; H04W 72/1294; H04W 72/1289; H04W 84/042; H04W 88/02; H04W 88/08; H04W 74/0833
See application file for complete search history.

(56) References Cited

U.S. PATENT DOCUMENTS 8,649,288 B2 * 2/2014 He .................... H04W 74/0833
370/252
2009/0190534 A1 7/2009 Yamada et al.
(Continued)

FOREIGN PATENT DOCUMENTS

| TW | 200735678 | 9/2007 |
| TW | 201021605 A1 | 6/2010 |

(Continued)

OTHER PUBLICATIONS

International Search Report for PCT/EP2013/075302 dated Jan. 30, 2014.

*Primary Examiner* — Clemence Han
(74) *Attorney, Agent, or Firm* — Fay Sharpe, LLP

(57) ABSTRACT

The invention relates to a base station (10) for a cellular communications system, wherein said cellular communications system preferably operates according to the long term evolution, LTE, standard, wherein said base station (10) is configured to transmit random access information, which comprises information on random access procedures associated with said base station (10), and/or scheduling information.

14 Claims, 2 Drawing Sheets

(51) Int. Cl.
*H04W 72/12* (2009.01)
*H04W 74/08* (2009.01)
*H04W 88/08* (2009.01)
*H04W 84/04* (2009.01)
*H04W 88/02* (2009.01)

(52) U.S. Cl.
CPC ...... *H04W 74/0833* (2013.01); *H04W 84/042* (2013.01); *H04W 88/02* (2013.01); *H04W 88/08* (2013.01)

(56) References Cited

U.S. PATENT DOCUMENTS

| | | |
|---|---|---|
| 2009/0191875 A1 | 7/2009 | Vujcic et al. |
| 2009/0285322 A1* | 11/2009 | Imamura ............... H04B 7/0452 375/267 |
| 2010/0034141 A1 | 2/2010 | Meylan |
| 2010/0254333 A1* | 10/2010 | Shin ....................... H04W 74/02 370/329 |
| 2010/0278131 A1 | 11/2010 | Jeong et al. |
| 2011/0170508 A1* | 7/2011 | Xue ....................... H04L 5/0055 370/329 |
| 2011/0283171 A1* | 11/2011 | Siew ...................... H04L 1/0079 714/807 |
| 2012/0082103 A1* | 4/2012 | Lin ....................... H04W 74/085 370/329 |
| 2012/0195268 A1 | 8/2012 | Huang et al. |
| 2013/0182680 A1* | 7/2013 | Choi ...................... H04W 28/20 370/331 |

FOREIGN PATENT DOCUMENTS

| | | |
|---|---|---|
| WO | WO 2009/002032 A1 | 12/2008 |
| WO | WO 2011/129674 A2 | 10/2011 |

\* cited by examiner

BASE STATION AND TERMINAL FOR A CELLULAR COMMUNICATIONS SYSTEM

FIELD OF THE INVENTION

The invention relates to a base station for a cellular communications system, wherein said cellular communications system preferably operates according to the long term evolution, LTE, standard.

The invention further relates to a method of operating a base station for a cellular communications system.

The invention further relates to terminal for a cellular communications system, wherein said cellular communications system preferably operates according to the long term evolution, LTE, standard, and to a method of operating such terminal.

BACKGROUND

The LTE communications standard is defined by 3GPP (3rd Generation Partnership Project) Specification series 3GPP TS 36.xxx, wherein 3GPP TS 36.211 relates to Physical Channels and Modulation. For further explanations in this application, the term "LTE standard" generally refers to the specification series 3GPP TS 36.xxx, particularly to LTE Release 8. More specifically, regarding 3GPP TS 36.211, in the following description, document version V8.7.0 is referred to, which is e.g. available on the World Wide Web (http://www.3gpp.org/ftp/Specs/html-info/36211.htm).

It is an object of the present invention to provide an improved base station, an improved terminal, and improved methods of operating said base station and said terminal which enable an efficient data transfer within LTE cells even for terminals with comparatively low complexity.

SUMMARY

According to the present invention, regarding the above-mentioned base station, this object is achieved by said base station being configured to transmit random access information, which comprises information on random access procedures associated with said base station, and/or scheduling information. This advantageously enables terminals to perform an efficient random access procedure and/or to send uplink data depending on said random access information and/or said scheduling information.

I.e., in contrast to conventional LTE base station, the base station according to the embodiments may provide details of a past or current or expected future random access situation so that terminals may take into consideration this information for planning a random access transmission to said base station.

According to an embodiment, said random access information comprises information on a contention probability within a cell provided by said base station. I.e., a terminal that has received such contention probability from the base station according to the embodiments may consider whether or not to perform a random access procedure at a specific point in time. For instance, if the contention probability is comparatively high (i.e., exceeds a first threshold), the terminal may choose to postpone a planned random access procedure to avoid contention. Otherwise, i.e. if the contention probability as signalled by the base station is comparatively low (i.e., lower than a second threshold), the terminal may choose to proceed with the random access procedure instantly due to the reduced risk of contention.

According to a further embodiment, said base station is configured to transmit said random access information and/or said scheduling information in at least one dedicated downlink channel, which is particularly different from a physical downlink control channel, PDCCH, as defined by the LTE standard. Thus, terminals are not required to detect the PDCCH and decode information comprised within the PDCCH, which requires rather complex evaluations due to e.g. turbo coding and the like. On the contrary, the dedicated downlink channel according to the embodiments may only comprise rather simple modulation and coding mechanisms which enable terminals with low complexity to efficiently attain the information comprised within the dedicated downlink channel, i.e. the scheduling information and/or the random access information as provided according to the embodiments.

According to a further embodiment, said dedicated downlink channel comprises less than 72 subcarriers, e.g. 24 or 36 subcarriers, in total. In this context, it is referred to the downlink resource grid of 3GPP TS 36.211, chapter 6.2.2, Figure 6.2.2-1. Usually, seventy-two subcarriers are employed within the LTE system for the synchronization channels such as P-SCH and S-SCH. The approach according to the embodiments, which proposes to use less than seventy-two subcarriers for the dedicated downlink channel according to the embodiments, advantageously enables terminals that are supposed to detect and process said dedicated downlink channel to provide less complex signal processing since a smaller bandwidth signal has to be processed.

According to a further embodiment, said dedicated downlink channel is arranged within at least one OFDM symbol, wherein said OFDM symbol comprising said dedicated downlink channel is preferably arranged adjacent to an OFDM symbol carrying a primary synchronization channel (P-SCH), or a secondary synchronization channel (S-SCH), of the LTE standard. Thus, the dedicated downlink channel may easily be detected within the base station's LTE downlink transmissions, since a terminal is supposed to detect the P-SCH and the S-SCH first to synchronize with the cell provided by the base station.

A further solution to the object of the present invention is given by a method of operating a base station for a cellular communications system, wherein said cellular communications system preferably operates according to the long term evolution, LTE, standard, wherein said base station transmits random access information, which comprises information on random access procedures associated with said base station, and/or scheduling information.

Advantageous embodiments are given by claims 7 to 9.

Yet another solution to the object of the present invention is given by a terminal for a cellular communications system, wherein said cellular communications system preferably operates according to the long term evolution, LTE, standard, wherein said terminal is configured to receive random access information, which comprises information on random access procedures associated with a base station of said cellular communications system, and/or scheduling information. Preferably, the terminal may receive such random access information and/or scheduling information from a base station according to the embodiments.

With respect to the terminal according to the embodiments, it is to be noted that the terminal itself is not required to be fully compatible to the LTE standard. Rather, it is sufficient for the terminal to a) be able to synchronize to a cell or base station, respectively, using the methods based on the P-SCH and the S-SCH, i.e., synchronization signals, as outlined by 3GPP TS 36.211 V8.7.0 chapter 6.11, and to
b) receive random access information and/or scheduling information according to the embodiments from a base station according to the embodiments, and to optionally
c) be able to transmit uplink data to the base station.

In other words, particularly, the terminal according to the embodiments is not required to be able to decode all of the LTE downlink channels, many of which are encoded using turbo coding. This requires rather complex signal processing. In contrast, the terminal according to the embodiments may only satisfy the above listed criteria a), b) (and c)), whereby a solution for uplink data transmission in an LTE system is given (in contrast to fully LTE-compatible terminals such as LTE capable smartphones) that has low-complexity. Thus, the terminal according to the embodiments may e.g. be used for sensor devices and other devices that have to be able to transmit data to a remote unit by using an LTE network, but that do not have to be able to e.g. allow for full-speed data transmission and other extended features of the LTE standard.

Particularly, according to an embodiment, the terminal is configured to synchronize with an LTE base station by using conventional P-SCH, S-SCH processing. After that, the terminal can receive random access information and/or scheduling information according to the embodiments from a base station according to the embodiments, which enables the terminal to plan its uplink data transmissions. Thus, no further downlink control information is to be evaluated by the terminal according to the embodiments for successfully sending uplink data. Finally, the terminal may send its data such as captured sensor values (e.g., weather data or the like).

According to a further embodiment, said terminal is configured to perform uplink data transmissions depending on said random access information and/or said scheduling information. The random access information may e.g. comprise a contention probability of the cell served by the bases station that transmits said random access information. Thus the terminal is notified of information useful for planning its future uplink data transmissions.

According to a further embodiment, said terminal is configured to synchronize to a base station by using a procedure as defined by the LTE standard, particularly by using information associated with a primary synchronization channel (P-SCH), or a secondary synchronization channel (S-SCH), of the LTE standard, and said terminal is configured to detect at least one dedicated downlink channel provided by said base station, wherein said at least one dedicated downlink channel comprises said random access information and/or said scheduling information.

Yet another solution to the object of the present invention is given by a method of operating a terminal for a cellular communications system, wherein said cellular communications system preferably operates according to the long term evolution, LTE, standard, wherein said terminal receives random access information, which comprises information on random access procedures associated with a base station of said cellular communications system, and/or scheduling information.

According to an embodiment, said terminal performs uplink data transmissions depending on said random access information and/or said scheduling information.

According to an embodiment, said terminal synchronizes to a base station by using a procedure as defined by the LTE standard, particularly by using information associated with a primary synchronization channel (P-SCH), or a secondary synchronization channel (S-SCH), of the LTE standard, wherein said terminal detects at least one dedicated downlink channel (DDCH) provided by said base station, wherein said at least one dedicated downlink channel (DDCH) comprises said random access information and/or said scheduling information.

Further features, aspects and advantages of the present invention are given in the following detailed description with reference to the drawings in which:

DESCRIPTION OF THE EMBODIMENTS

Figure 1:
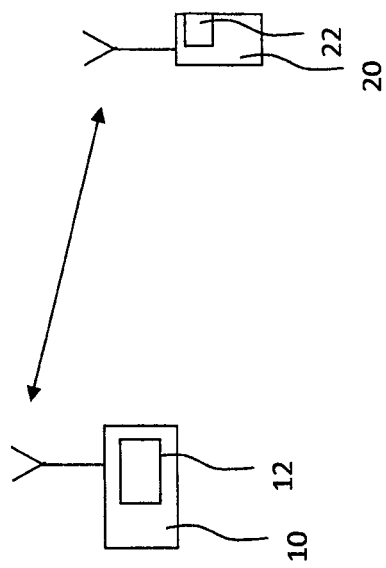
FIG. 1 depicts a schematic block diagram of a base station and a terminal according to an embodiment, FIG. 2 schematically depicts a simplified flow-chart of a method according to the embodiments, and FIG. 3 schematically depicts an LTE radio frame illustrating a position of a dedicated downlink channel according to the embodiments.

FIG. 1 depicts a schematic block diagram of a base station 10 and a terminal 20 according to an embodiment. The base station 10 is compatible to the LTE standard and comprises a control unit 12 that controls an operation of the base station 10. For this, the control unit 12 may e.g. comprise a processor. Likewise, the terminal 20 comprises a control unit 22 that controls an operation of the terminal 20.

In contrast to the base station 10, which is preferably fully compatible to the LTE standard, the terminal 20 according to an embodiment is not required to be fully compatible to the LTE standard. However, according to other embodiments, the terminal 20 may also be fully compatible to the LTE standard.

Figure 2:
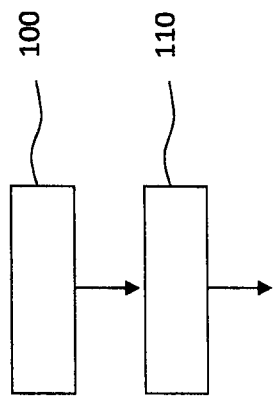

FIG. 2 schematically depicts a simplified flow-chart of a method of operating a terminal 20 according to an embodiment. In a first step 100, the terminal 20 receives random access information, which comprises information on random access procedures associated with the base station 10, and/or scheduling information from the base station 10. In the following step 110, the terminal performs one or more uplink data transmissions depending on said random access information and/or said scheduling information.

According to a preferred embodiment, said random access information comprises information on a contention probability within a cell provided by said base station 10. Thus, when receiving said random access information, said terminal 20 may consider whether or not to perform a random access procedure at a specific point in time. For instance, if the contention probability is comparatively high (i.e., exceeds a first threshold), the terminal 20 may choose to postpone a planned random access procedure to avoid contention with other terminals (not shown). Otherwise, i.e. if the contention probability as signalled by the base station 10 is comparatively low (i.e., lower than a second threshold), the terminal 20 may choose to proceed with the random access procedure instantly due to the reduced risk of contention.

According to a preferred embodiment, the base station 10 transmits at least one of said random access information and said scheduling information, preferably both types of information, in at least one dedicated downlink channel DDCH, which is particularly different from a physical downlink control channel, PDCCH, as defined by the LTE standard. Thus, a terminal only has to detect said dedicated downlink channel DDCH according to the embodiments to attain the random access information and/or scheduling information comprised therein. This particularly helps to avoid complex decoding in the terminal 20 thus enabling to deploy terminals 20 with reduced complexity. Such terminals 20 with reduced complexity may e.g. be used to form sensor networks or the like, wherein the terminals 20 may advantageously use LTE uplink transmissions to respective base stations 10 for sending data to remote devices.

Figure 3:
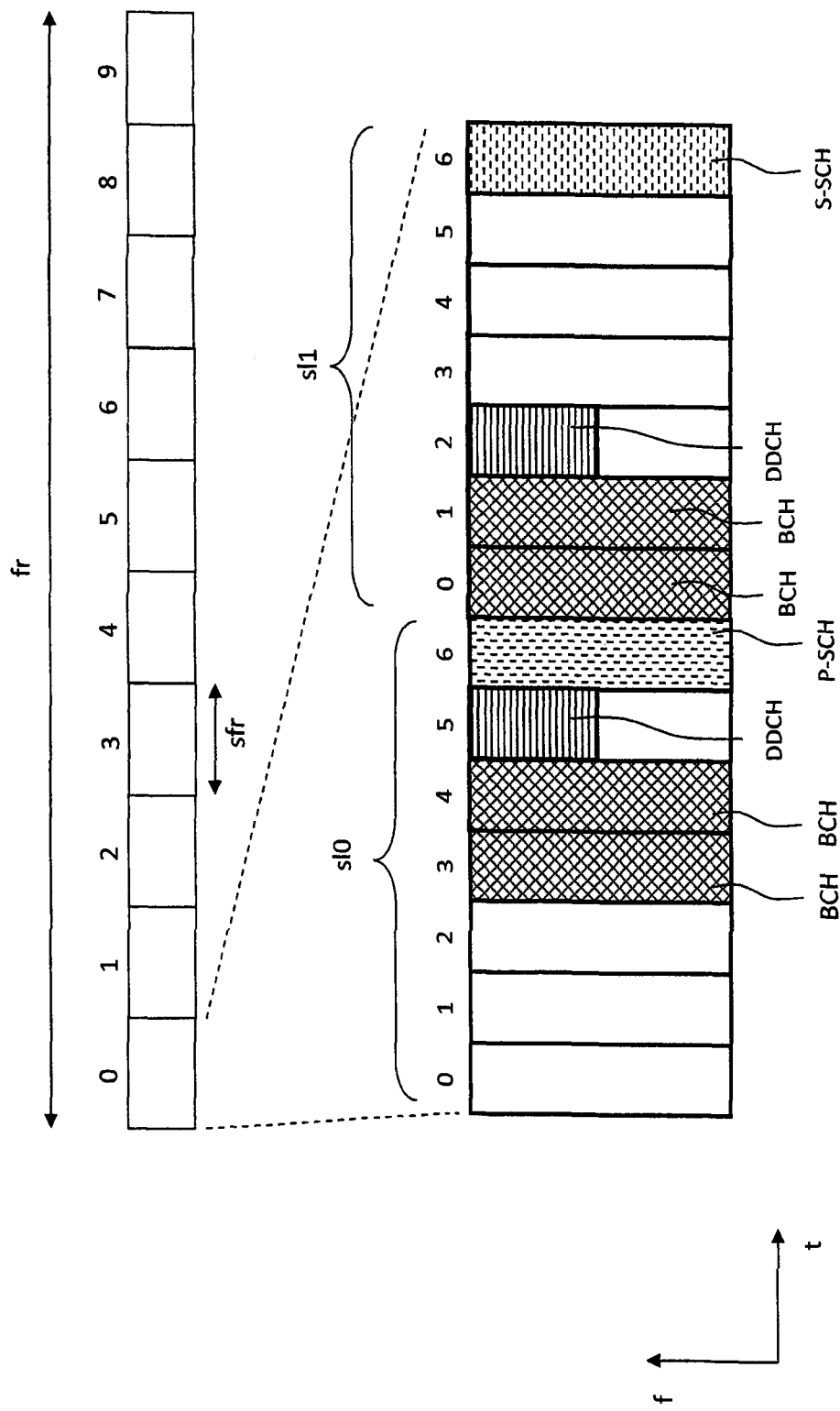

FIG. 3 schematically depicts an LTE radio frame fr illustrating a position of a dedicated downlink channel DDCH according to the embodiments relative to LTE-standard channels such as the P-SCH, S-SCH, BCH (broadcast channel).

As can be seen from FIG. 3, the LTE radio frame fr comprises 10 subframes, which are numbered from "0" to "9". In the bottom of FIG. 3, the first subframe, i.e. subframe #0, is depicted in detail. As can be seen, subframe #0—as any other subframe of the frame fr—is partitioned into two slots sl0, sl1. Each slot sl0, sl1 comprises seven OFDM (orthogonal frequency division multiplexing) symbols numbered from "0" to "6" in FIG. 3.

3GPP TS 36.211, V8.7.0, chapter 4, comprises more details on LTE frame structures, and chapter 6.2.2 of the same document comprises more details on the LTE downlink resource grid.

For the sake of clarity, a time axis t and a frequency axis f is also depicted by FIG. 3 indicating that single OFDM symbols of the slots sl0, sl1 are transmitted subsequently in time. As can be gathered from 3GPP TS 36.211, V8.7.0, chapter 6.2.2, a resource block may comprise e.g. twelve subcarriers.

From the detailed depiction of the slots sl0, sl1 of FIG. 3, the P-SCH and the S-SCH as defined by the LTE standard can be identified to be located in the last OFDM symbol (symbol number "6") of the respective slot sl0, sl1. Exemplarily, also the BCH is depicted by FIG. 3, presently being arranged in OFDM symbols number "3", "4" of slot sl0 and in OFDM symbols number "0", "1" of slot sl1.

While the aforementioned channels P-SCH, S-SCH, BCH are defined by the LTE standard, the dedicated downlink channel DDCH as also depicted by FIG. 3 is not defined by the LTE standard but proposed by embodiments of the present invention to enhance the existing LTE system particularly with respect to enabling terminals 20 with reduced complexity to take part in LTE communications.

More specifically, as also mentioned above, the base station 10 according to the embodiments transmits at least one of said random access information and said scheduling information, preferably both types of information, in at least one dedicated downlink channel DDCH, which is particularly different from a physical downlink control channel, PDCCH, as defined by the LTE standard. As can be seen from FIG. 3, the DDCH according to the embodiments is particularly also different from the P-SCH and the S-SCH, but preferably located close to it in terms of time dimension, i.e. OFDM symbols, respectively.

According to a preferred embodiment, at least one OFDM symbol of a slot sl0, sl1 carriers the DDCH with its random access information and/or scheduling information. With the present embodiment of FIG. 3, two OFDM symbols are partly used for the DDCH, namely OFDM symbol number "5" of slot sl0 and OFDM symbol number "2" of slot sl1.

According to a further preferred embodiment, the DDCH does not use the full bandwidth of seventy-two subcarriers, as is e.g. defined for P-SCH and S-SCH. The DDCH may rather only use less than seventy-two subcarriers, for example twenty-four or thirty-six subcarriers or the like.

Other values are also possible. This enables simplified signal processing in the terminal 20 for detecting the information of the DDCH, since only a reduced signal bandwidth has to be dealt with—in contrast to seventy-two subcarriers.

Thus, advantageously, a terminal 20 only has to detect said dedicated downlink channel DDCH according to the embodiments to attain the random access information and/or scheduling information comprised therein. This particularly helps to avoid complex decoding in the terminal 20 thus enabling to deploy terminals 20 with reduced complexity. Such terminals 20 with reduced complexity may e.g. be used to form sensor networks or the like, wherein the terminals 20 may advantageously use LTE uplink transmissions to respective base stations 10 for sending data to remote devices.

According to a further embodiment, the terminal 20 performs uplink data transmissions to said base station 10 depending on said random access information and/or said scheduling information it has previously received from the base station 10, particularly within said dedicated downlink channel DDCH.

According to a further embodiment, the terminal 20 synchronizes to the base station 10 by using a procedure as defined by the LTE standard, particularly by using information associated with the primary synchronization channel P-SCH, and/or the secondary synchronization channel S-SCH, of the LTE standard.

Advantageously, after that, said terminal 20 detects at least one dedicated downlink channel DDCH provided by said base station 10, wherein said at least one dedicated downlink channel DDCH comprises said random access information and/or said scheduling information according to the embodiments.

I.e., only upon detecting said dedicated downlink channel DDCH according to the embodiments, the terminal 20 is enabled to plan its future uplink transmissions either in a random access fashion or in a scheduled fashion using the scheduling information received via the dedicated downlink channel DDCH.

When using random access (RA), the terminal 20 may e.g. employ the techniques as defined by the LTE standard. Additionally, the terminal 20 may include its uplink data to such RA transmissions, so that no scheduled transmissions at all are required for enabling the terminal 20 to send its uplink data to the base station 10.

On the other hand, the terminal 20 may also perform scheduled uplink transmissions in uplink resources that have been indicated by the base station 10 e.g. in the course of the transmissions over the dedicated downlink channel DDCH.

Combinations of RA and scheduled uplink transmissions are also possible.

With respect to the terminal 20 according to the embodiments, it is to be noted that the terminal 20 itself is not required to be fully compatible to the LTE standard. Rather, it is sufficient for the terminal 20 to
  a) be able to synchronize to a cell or base station 10, respectively, using the methods based on the P-SCH and the S-SCH, i.e., synchronization signals, as outlined by 3GPP TS 36.211 V8.7.0 chapter 6.11, and to
  b) receive random access information and/or scheduling information according to the embodiments from a base station 10 according to the embodiments, and to optionally
  c) be able to transmit uplink data to the base station 10 (either in RA or scheduled fashion).

In other words, particularly, the terminal 20 according to the embodiments is not required to be able to decode all of the LTE downlink channels, many of which are encoded using turbo coding. This requires rather complex signal processing. In contrast, the terminal 20 according to the embodiments may only satisfy the above listed criteria a), b) (and c)), whereby a solution for uplink data transmission in an LTE system is given (in contrast to fully LTE-compatible terminals such as LTE capable smartphones) that has low-complexity. Thus, the terminal 20 according to the embodiments may e.g. be used for sensor devices and other devices that have to be able to transmit data to a remote unit by using an LTE network, but that do not have to be able to e.g. allow for full-speed data transmission and other extended features of the LTE standard.

According to one aspect of the embodiments, terminals 20 with low complexity that are capable of RA-type and scheduled LTE uplink transmissions are provided. Thus, very low cost machine type terminal devices may be provided, e.g. for integrating LTE communication capabilities into simple sensor devices and the like. One principle according to some embodiments is that the terminals 20 (machine type devices) need only parts of the normal LTE downlink and uplink processing chain. In downlink, for example, according to an embodiment of the terminal 20, only a processing for detection of the LTE Synch Channel (P-SCH and S-SCH, cf. FIG. 3) is needed. Notice, that the SCH in LTE is very simple, namely it does not require any channel decoding operation.

According to a further embodiment, which relates to the base station 10, e.g. adding a few bits of information can advantageously inform very cheap machine type devices/terminals 20 about e.g. time and frequency resources for a transmission (=scheduling information), Random access information (e.g. contention probability). For this purpose, the Random access information and/or the scheduling information may e.g. be included in the dedicated downlink channel DDCH as explained above with reference to FIG. 3.

According to a further embodiment, a terminal 20 may synchronize to the LTE network by using conventional procedures, e.g. based on detecting the P-SCH and the S-SCH as provided by a base station 10, and said terminal 20 may send e.g. in a random access fashion its data. According to a further embodiment, a few resources, preferably with low effective bandwidth (for example, some six subcarriers), are reserved for this random access type communications.

According to a further embodiment, a terminal 20 may transmit and, if necessary, retransmit packets with its uplink data according to an algorithm that takes into account the contention probability signaled from the base station 10 to the terminal 20 by means of the random access information, e.g. within the dedicated downlink channel.

When using the principle according to the embodiments, for transmitting the random access information and/or scheduling information and for the uplink transmissions of the terminals 20, no HARQ (hybrid automatic repeat request) involving ACK/NACK signalling is required, so that complexity of the terminals 20 may be reduced.

One application of the principle according to the embodiments is the provisioning of weather sensors that comprise LTE uplink transmission capabilities in the form of the terminal 20 for sending their weather data to remote devices by using an LTE radio network.

Advantageously, according to the present embodiments, complex downlink transmissions that e.g. involve turbo coding at the base station 10 and turbo decoding at the terminal may be avoided.

According to a further embodiment, random access algorithms used at the terminals 20 can be very conservative thus providing to retransmit more often since no ACK information is provided.

Below a further operating scenario according to the embodiments is described. It is assumed that a new downlink channel, i.e. the dedicated downlink channel DDCH (FIG. 3) as explained above is defined for transmitting RA information and/or scheduling data to terminals 20 in a very simple fashion. Preferably, the dedicated downlink channel DDCH is arranged close to the LTE SYNCH channel P-SCH, S-SCH and, also preferably in a similar way as the synchronization channels in the LTE standard (e.g., similar periodicity).

Preferably, according to an embodiment, the bandwidth requirement of the dedicated downlink channel DDCH is comparatively small, because only a small number of options are signaled.

According to an embodiment, the information to be transmitted over the dedicated downlink channel DDCH is mapped to an employed root sequence and cyclic shift, as it is already done in the LTE SYNCH channel. In other words, for coding the date to be transmitted over the dedicated downlink channel DDCH, according to one embodiment, the base station 10 may employ the same root sequence and cyclic shift as it has employed for defining the contents of P-SCH and S-SCH, also cf. 3GPP TS 36.211 V8.7.0, chapter 6.11, especially the parameters "root index u" of Table 6.11.1.1-1 and "m0", "m1" of chapter 6.11.2.1.

According to an embodiment, in order to expand the possible amount of information to be transmitted from the base station 10 to one or more terminals 20, one can exploit two or more dedicated downlink channels DDCH.

For further illustration, according to an embodiment, it is assumed that four different classes of terminals 20 are defined, wherein a cell served by a base station 10 comprises 100 terminals 20 according to the embodiments.

Four classes of different terminals 20 are defined, such as:
1: very low complex-terminals—Service 1
2: very low complex-terminals—Service 2
3: more complex terminals—Service 3
4: more complex terminals—Service 4

In this example, 25 machines of each class are assumed. At each realization of the dedicated downlink channel DDCH, one sequence of N many bits is transmitted for a specific service (of the above listed four types of service). Every terminal 20 may synchronize with the dedicated downlink channel DDCH during any sequence of the dedicated downlink channel DDCH, independent if the current information is aimed at another service class. When a terminal 20 receives the sequence "Ns" corresponding to its class, it then looks at the transmission information comprised within the dedicated downlink channel DDCH to setup its transmission.

In the case of services classes 3 and 4, the terminals 20 might be informed to operate in scheduled manner as normal LTE user equipments (UEs), or to transmit via a dedicated Random access channel, which is specific for the service classes 3 and 4, in contrast to the dedicated Random access channel provided for said service classes 1 and 2, wherein for the service classes 3 and 4, information may be transmitted which is coded by the base station and which requires corresponding decoding at the terminals (e.g., ACK/NACK and the like). Also, the information of the dedicated Random access channel for service classes 3 and 4 may comprise random access information specific to the Random access channel for these service classes 3 and 4.

The present example particularly considers classes 1 and 2, where sequences are used to carry RA information, such as contention information, especially (among others) an average density of retransmissions that the terminals 20 have to transmit in order to complete an uplink data transmission. As soon as the terminals 20 decode this information, they transmit their packets in the uplink randomly where its retransmission intensity is ruled by a quantized retransmission probability. It can be also defined by the future LTE standard the frequency that the terminals 20 have to look at the dedicated downlink channel DDCH again in order to update their parameters for transmission.

Advantageously, according to an embodiment, the terminal 20 is not required to have any decoding capabilities for attaining the random access (RA) information and/or scheduling information according to the embodiments, which may be provided by the base station 10 in the dedicated downlink channel DDCH.

Although according to another embodiment there is no mechanism that guarantees any quality of service for random access type transmissions of the terminal 20 according to the embodiments, nevertheless, it is possible for the communications network to infer that packets of some specific service (i.e., terminals 20 associated with this service) are not arriving and then to e.g. change the retransmission parameters of this service (or terminal 20) until the packets are correctly received.

The principles according to the embodiments advantageously enable a simplified signaling between terminals 20 and base stations 10 of an LTE system. Such solution can be optimally implemented in future generations, e.g. 5G communications networks, or future releases of LTE still adopt this approach to enable terminals 20 with very low complexity to make uplink data transmissions in the LTE network. However, the principles according to the embodiments are not limited to the LTE standard.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labelled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A base station for a cellular communications system, wherein said cellular communications system operates according to the long term evolution, LTE, standard, wherein said base station is configured to transmit random access information, which comprises information on random access procedures associated with said base station, or scheduling information, wherein said base station is configured to transmit said random access information or said scheduling information in at least one dedicated downlink channel, which is different from a physical downlink control channel, PDCCH, as defined by the LTE standard; and wherein said dedicated downlink channel is arranged within at least one OFDM symbol, wherein said OFDM symbol comprising said dedicated downlink channel is arranged adjacent to an OFDM symbol carrying a primary synchronization channel, or a secondary synchronization channel, of the LTE standard.

2. The base station according to claim 1, wherein said random access information comprises information on a contention probability within a cell provided by said base station.

3. The base station according to claim 1, wherein said dedicated downlink channel comprises less than seventy-two subcarriers.

4. A method of operating a base station for a cellular communications system, wherein said cellular communications system operates according to the long term evolution, LTE, standard, wherein said base station transmits random access information, which comprises information on random access procedures associated with said base station, or scheduling information, wherein said base station transmits said random access information or said scheduling information in at least one dedicated downlink channel, which is different from a physical downlink control channel, PDCCH, as defined by the LTE standard; and wherein said dedicated downlink channel is arranged within at least one OFDM symbol, wherein said OFDM symbol comprising said dedicated downlink channel is arranged adjacent to an OFDM symbol carrying a primary synchronization channel, or a secondary synchronization channel, of the LTE standard.

5. The method according to claim 4, wherein said random access information comprises information on a contention probability within a cell provided by said base station.

6. The method according to claim 4, wherein said dedicated downlink channel comprises less than seventy-two subcarriers.

7. A terminal for a cellular communications system, wherein said cellular communications system operates according to the long term evolution, LTE, standard, wherein said terminal is configured to receive random access information, which comprises information on random access procedures associated with a base station of said cellular communications system, or scheduling information, wherein said terminal is configured to synchronize to a base station by using a procedure as defined by the LTE standard, and wherein said terminal is configured to detect at least one dedicated downlink channel provided by said base station, wherein said at least one dedicated downlink channel comprises said random access information or said scheduling information; and wherein said dedicated downlink channel is arranged within at least one OFDM symbol, wherein said OFDM symbol comprising said dedicated downlink channel is arranged adjacent to an OFDM symbol carrying a primary synchronization channel, or a secondary synchronization channel, of the LTE standard.

8. The terminal according to claim 7, wherein said terminal is configured to perform uplink data transmissions depending on said random access information or said scheduling information.

9. A method of operating a terminal for a cellular communications system, wherein said cellular communications system operates according to the long term evolution, LTE, standard, wherein said terminal receives random access information, which comprises information on random access procedures associated with a base station of said cellular communications system, or scheduling information, wherein said terminal synchronizes to a base station by using a procedure as defined by the LTE standard, and wherein said terminal detects at least one dedicated downlink channel provided by said base station, wherein said at least one dedicated downlink channel comprises said random access information or said scheduling information; and wherein said dedicated downlink channel is arranged within at least one OFDM symbol, wherein said OFDM symbol comprising said dedicated downlink channel is arranged adjacent to an OFDM symbol carrying a primary synchronization channel, or a secondary synchronization channel, of the LTE standard.

10. The method according to claim 9, wherein said terminal performs uplink data transmissions depending on said random access information or said scheduling information.

11. A base station for a cellular communications system, wherein said cellular communications system operates according to the long term evolution, LTE, standard, wherein said base station is configured to transmit random access information, which comprises information on random access procedures associated with said base station, or scheduling information, wherein said base station is configured to transmit said random access information or said scheduling information in at least one dedicated downlink channel, which is different from a physical downlink control channel, PDCCH, as defined by the LTE standard; and wherein the random access information comprises contention probability information;

if the contention probability information exceeds a first threshold, a terminal postpones a planned random access procedure; and if the contention probability information is lower than a second threshold, the terminal proceeds immediately with the planned random access procedure.

12. A method of operating a base station for a cellular communications system, wherein said cellular communications system operates according to the long term evolution, LTE, standard, wherein said base station transmits random access information, which comprises information on random access procedures associated with said base station, or scheduling information, wherein said base station transmits said random access information or said scheduling information in at least one dedicated downlink channel, which is different from a physical downlink control channel, PDCCH, as defined by the LTE standard; and wherein the random access information comprises contention probability information;

if the contention probability information exceeds a first threshold, a terminal postpones a planned random access procedure; and if the contention probability information is lower than a second threshold, the terminal proceeds immediately with the planned random access procedure.

13. A terminal for a cellular communications system, wherein said cellular communications system operates according to the long term evolution, LTE, standard, wherein said terminal is configured to receive random access information, which comprises information on random access procedures associated with a base station of said cellular communications system, or scheduling information, wherein said terminal is configured to synchronize to a base station by using a procedure as defined by the LTE standard, and wherein said terminal is configured to detect at least one dedicated downlink channel provided by said base station, wherein said at least one dedicated downlink channel comprises said random access information or said scheduling information; and wherein the random access information comprises contention probability information; and wherein the terminal is configured to:

if the contention probability information exceeds a first threshold, postpone a planned random access procedure; and if the contention probability information is lower than a second threshold, proceed immediately with the planned random access procedure.

14. A method of operating a terminal for a cellular communications system, wherein said cellular communications system operates according to the long term evolution, LTE, standard, wherein said terminal receives random access information, which comprises information on random access procedures associated with a base station of said cellular communications system, or scheduling information, wherein said terminal synchronizes to a base station by using a procedure as defined by the LTE standard, and wherein said terminal detects at least one dedicated downlink channel provided by said base station, wherein said at least one dedicated downlink channel comprises said random access information or said scheduling information; and wherein the random access information comprises contention probability information; and if the contention probability information exceeds a first threshold, the terminal postpones a planned random access procedure; and if the contention probability information is lower than a second threshold, the terminal proceeds immediately with the planned random access procedure.

\* \* \* \* \*